(No Model.)
W. WILTSE, Jr.
GRAFTING KNIFE.
No. 496,079.  Patented Apr. 25, 1893.
FIG_1_
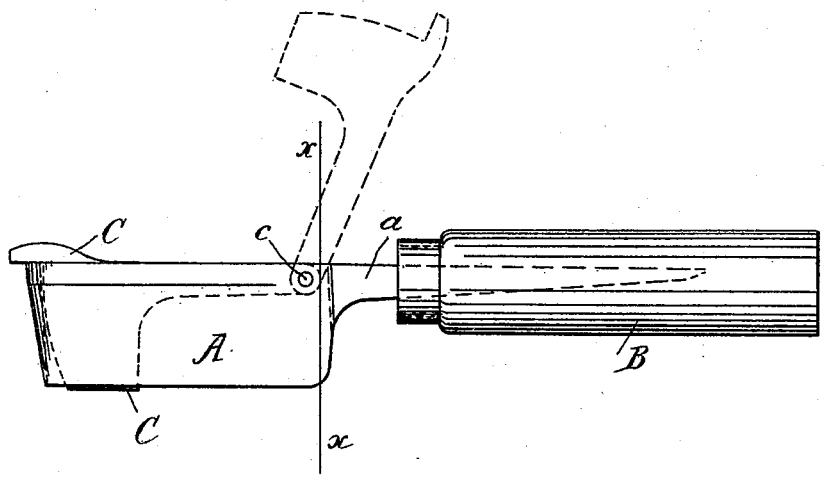
FIG_2_
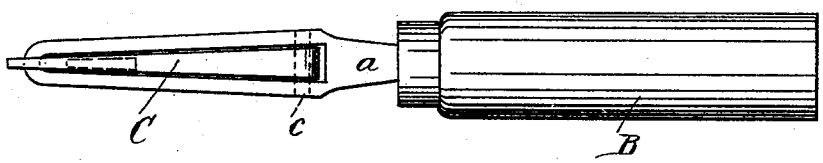
FIG_3_
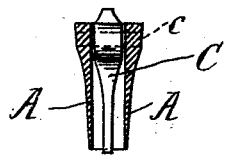
Witnesses
Herbert W. T. Jenner
J. A. Fullerton
Inventor
William Wiltse, Jun.
By his Attorney
D. J. Murphy

UNITED STATES PATENT OFFICE.

WILLIAM WILTSE, JR., OF GILBOA, NEW YORK.

GRAFTING-KNIFE.

SPECIFICATION forming part of Letters Patent No. 496,079, dated April 25, 1893.

Application filed December 7, 1891. Renewed September 30, 1892. Serial No. 447,434. (No model.)

*To all whom it may concern:*

Be it known that I, WILLIAM WILTSE, Jr., a citizen of the United States, residing at Gilboa, in the county of Schoharie and State of New York, have invented certain new and useful Improvements in Grafting - Knives; and I do hereby declare the following to be a full, clear, and exact description of the invention, such as will enable others skilled in the art to which it appertains to make and use the same.

This invention relates to grafting knives; and it consists in the novel construction and combination of the parts as hereinafter fully described and claimed.

In the drawings: Figure 1 is a side view of the knife. Fig. 2 is a plan view, looking at the back of the knife. Fig. 3 is a cross-section through the knife, taken on the line $x$ $x$ in Fig. 1.

The knife consists of two blades A A, formed by bending double a single blade having a similar shank at each end, and then welding the two shanks together to form the shank $a$. The shank $a$ is secured in a handle B in the ordinary manner. The two blades are inclined as shown in the drawings, and the point of the knife is rounded so that it may not easily be broken off.

C is a tongue which is pivoted on the rivet $c$ between the blades, for the purpose of driving out the chips after the cut has been made in the stock.

This knife is used in the following manner: The operator first cuts off the branch that is to be grafted, and then instead of splitting the stock in the ordinary manner, he cuts a wedge-shaped groove or space in it by means of the knife. The tongue is held up with the little finger of the left hand, and the knife is placed against the stock and driven into it by gentle blows of a light mallet. When the knife is driven in deep enough to form a space of sufficient size to receive the scion, the operator moves the handle forward over the stock, and pulls the knife out together with the chip. The chip is driven out from between the blades by means of the tongue. The scion is then inserted in the space prepared for it, and is secured in any approved manner.

By using this knife the operator can readily graft stocks of large size and set scions around them at short distances apart.

What I claim is—

A grafting knife, consisting of two inclined blades provided with a rounded point and a shank common to the two blades, in combination with a tongue pivoted between the blades and adapted to remove the chips, substantially as described and shown.

In testimony whereof I affix my signature in presence of two witnesses.

WILLIAM WILTSE, JR.

Witnesses:
J. S. LAWYER,
O. T. DAVIS.